US011209263B2

(12) United States Patent
Lin et al.

(10) Patent No.: US 11,209,263 B2
(45) Date of Patent: Dec. 28, 2021

(54) 3D HAND POSE ESTIMATION BASED ON DEPTH-IMAGE GUIDED ADVERSARIAL NETWORK 1

(71) Applicant: TENCENT AMERICA LLC, Palo Alto, CA (US)

(72) Inventors: Shih-Yao Lin, Palo Alto, CA (US); Yusheng Xie, Mountain View, CA (US); Hui Tang, Mountain View, CA (US); Chao Huang, Palo Alto, CA (US); Lianyi Han, Palo Alto, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 41 days.

(21) Appl. No.: 16/712,228

(22) Filed: Dec. 12, 2019

(65) Prior Publication Data

US 2021/0180942 A1 Jun. 17, 2021

(51) Int. Cl.
*G01B 11/22* (2006.01)
*G06K 9/00* (2006.01)
*G06T 7/55* (2017.01)
*G06T 7/73* (2017.01)
*G06N 3/08* (2006.01)
*G06T 7/529* (2017.01)

(52) U.S. Cl.
CPC .......... *G01B 11/22* (2013.01); *G06K 9/00355* (2013.01); *G06N 3/08* (2013.01); *G06T 7/529* (2017.01); *G06T 7/55* (2017.01); *G06T 7/74* (2017.01); *G06T 2200/04* (2013.01); *G06T 2207/10028* (2013.01)

(58) Field of Classification Search
CPC .. G01B 11/22; G06N 3/08; G06T 7/55; G06T 7/529; G06T 7/74; G06T 2207/10028; G06T 2200/04; G06K 9/00355
USPC ......................................................... 382/103
See application file for complete search history.

(56) References Cited

U.S. PATENT DOCUMENTS

| 2019/0034714 | A1 | 1/2019 | Barth et al. |
| 2019/0188460 | A1 | 6/2019 | Zhang et al. |
| 2020/0380720 | A1* | 12/2020 | Dixit ....................... G06T 7/168 |

OTHER PUBLICATIONS

Real-Time Continuous Pose Recovery of Human Hands Using Convolutional Networks ACM Transactions on Graphics vol. 33 Issue 5 Aug. 2014 Article No. 169pp. 1-10 https://doi.org/10.1145/2629500 (Year: 2014).*
Written Opinion in International Application No. PCT/US20/49855, dated Dec. 1, 2020.
International Search Report in International Application No. PCT/US20/49855, dated Dec. 1, 2020.

(Continued)

*Primary Examiner* — Amandeep Saini
(74) *Attorney, Agent, or Firm* — Sughrue Mion, PLLC

(57) ABSTRACT

A computer-implemented method, computer readable storage medium, and computer system is provided for estimating three-dimensional (3D) hand poses in images by receiving data corresponding to a hand image, generating a depth map corresponding to the received hand image data, and estimating a hand pose from the received hand image data and the generated depth map.

20 Claims, 8 Drawing Sheets

(56) References Cited

OTHER PUBLICATIONS

Chengde Wan et al, "Crossing Nets: Combining GANs and VAEs with a Shared Latent Space for Hand Pose Estimation", 2017 IEEE Conference on Computer Vision and Pattern Recognition (CVPR), Nov. 9, 2017, pp. 680-689 (11 pages Total).

Mueller. F et al., "Real-time Hand Tracking under Occlusion from an Egocentric RGB-D Sensor", 2017 IEEE International Conference on Computer Vision (ICCV), Dec. 25, 2017, (11 Pages Total).

Wang. M et al., "DRPose3D: Depth Ranking in 3D Human Pose Estimation" IJCAI-18: Proceedings of the 27th International Joint Conference on Artificial Intelligence, Jul. 2018, pp. 978-984 (8 pages).

He, W et al. "Synthesizing Depth Hand Images with GANs and Style Transfer for Hand Pose Estimation", MDPI, sensors, Jul. 1, 2019, (30 Pages Total).

\* cited by examiner

3D HAND POSE ESTIMATION BASED ON DEPTH-IMAGE GUIDED ADVERSARIAL NETWORK 1

BACKGROUND

This disclosure relates generally to field of computing, and more particularly to estimating 3D hand poses.

Hand pose estimation is the task of finding the joints of the hand from an image or a set of video frames. Estimating three-dimensional (3D) hand poses from red-green-blue (RGB) color images is essential to a wide range of potential applications, such as computer vision, virtual reality, augmented reality, and other forms of human-computer interaction. Estimating hand poses from RGB images has become significantly more popular due to the accessibility of capturing RGB images through webcams, Internet of Thing (IoT) cameras, and smartphones.

SUMMARY

Embodiments relate to a method, system, and computer readable medium for estimating 3D hand poses. According to one aspect, a method for estimating 3D hand poses is provided. The method may include receiving, by a computer, data corresponding to a hand image and generating a depth map corresponding to the received hand image data. The computer may estimate a hand pose from the received hand image data and the generated depth map.

According to another aspect, a computer system for estimating 3D hand poses is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving, by a computer, data corresponding to a hand image and generating a depth map corresponding to the received hand image data. The computer may estimate a hand pose from the received hand data image and the generated depth map.

According to yet another aspect, a computer readable medium for estimating 3D hand poses is provided. The computer readable medium may include one or more computer-readable storage devices and program instructions stored on at least one of the one or more tangible storage devices, the program instructions executable by a processor. The program instructions are executable by a processor for performing a method that may accordingly include receiving, by a computer, a data corresponding to a hand image and generating a depth map corresponding to the received hand image data. The computer may estimate a hand pose from the received hand image data and the generated depth map.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating one skilled in the art in understanding this disclosure in conjunction with the detailed description. In the drawings.

DETAILED DESCRIPTION

Figure 1:
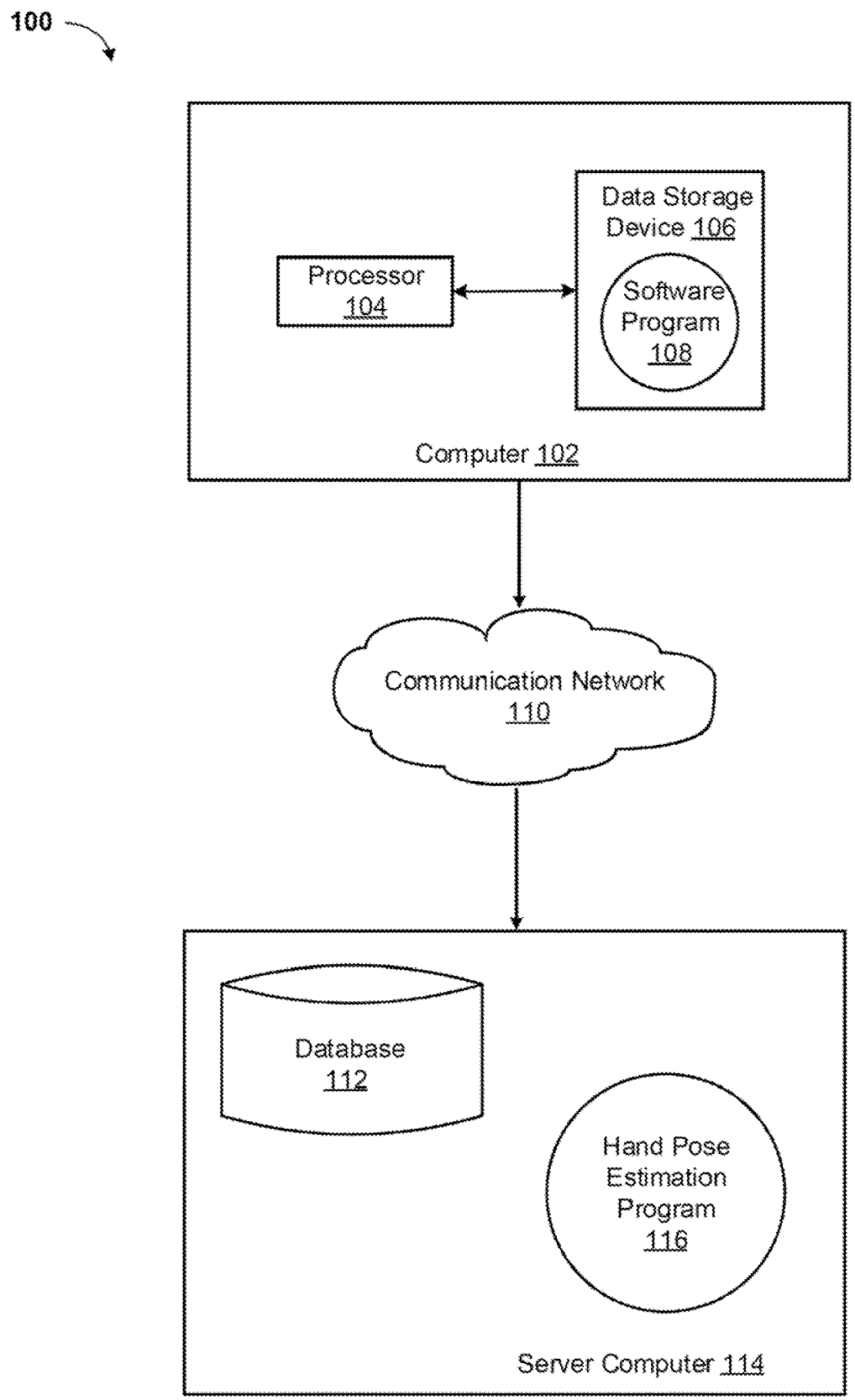
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Aspects of this disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

Embodiments relate generally to the field of computing, and more particularly to estimating 3D hand poses. The following described exemplary embodiments provide a system, method and program product to, among other things, determine 3D hand poses present within 2D RGB images using only the 2D RGB images. Therefore, the computer-implemented method, computer system, and computer readable medium disclosed herein have the capacity to improve the field of computing by allowing for computers to determine 3D shapes from 2D images without the use of corresponding depth maps. Furthermore, while the method, system, and computer readable medium disclosed herein are described with respect to hand poses, the described embodiments may also be configured for improved estimation of other 3D shapes.

As previously described, hand pose estimation is the task of finding the joints of the hand from an image or a set of video frames. Estimating three-dimensional (3D) hand poses from color RGB images is essential to a wide range of potential applications, such as computer vision, virtual reality, augmented reality, and other forms of human-computer interaction. Estimating hand poses from RGB images has become significantly more popular due to the accessibility of capturing RGB images through webcams, Internet of Thing (IoT) cameras, and smartphones.

However, estimating these poses is challenging due to ambiguity in inferring depth information from RGB images. Hand pose estimators may regularize 3D hand pose estimation models during training to enforce the consistency between the predicted 3D poses and the ground truth depth maps, but these estimators rely on the availability of both RGB images and paired depth maps during training. It may be advantageous, therefore, to utilize a conditional generative adversarial network (GAN) model to generate realistic depth maps conditioned on the input RGB image and to use the synthesized depth maps to regularize the 3D hand pose estimation model. Such a Depth-image Guided GAN (DG-GAN) may eliminate the need for depth maps to be uploaded simultaneously with RGB images to be analyzed. A DGGAN may also effectively regularize the pose estimation model.

Aspects are described herein with reference to flowchart illustrations and/or block diagrams of methods, apparatus (systems), and computer readable media according to certain embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and program product that estimates 3D hand poses. According to the present embodiment, this estimation may be performed by utilizing a Depth-image Guided GAN on a monocular RGB image to infer the depth-map from the RGB image.

Referring now to FIG. 1, a functional block diagram of a networked computer environment illustrating a hand pose estimation system 100 (hereinafter "system") for improved estimation of 3D hand poses in images is shown. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 8 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for estimating 3D hand poses in images is enabled to run an Hand Pose Estimation Program 116 (hereinafter "program") that may interact with a database 112. The Hand Pose Estimation Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger hand pose estimation program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
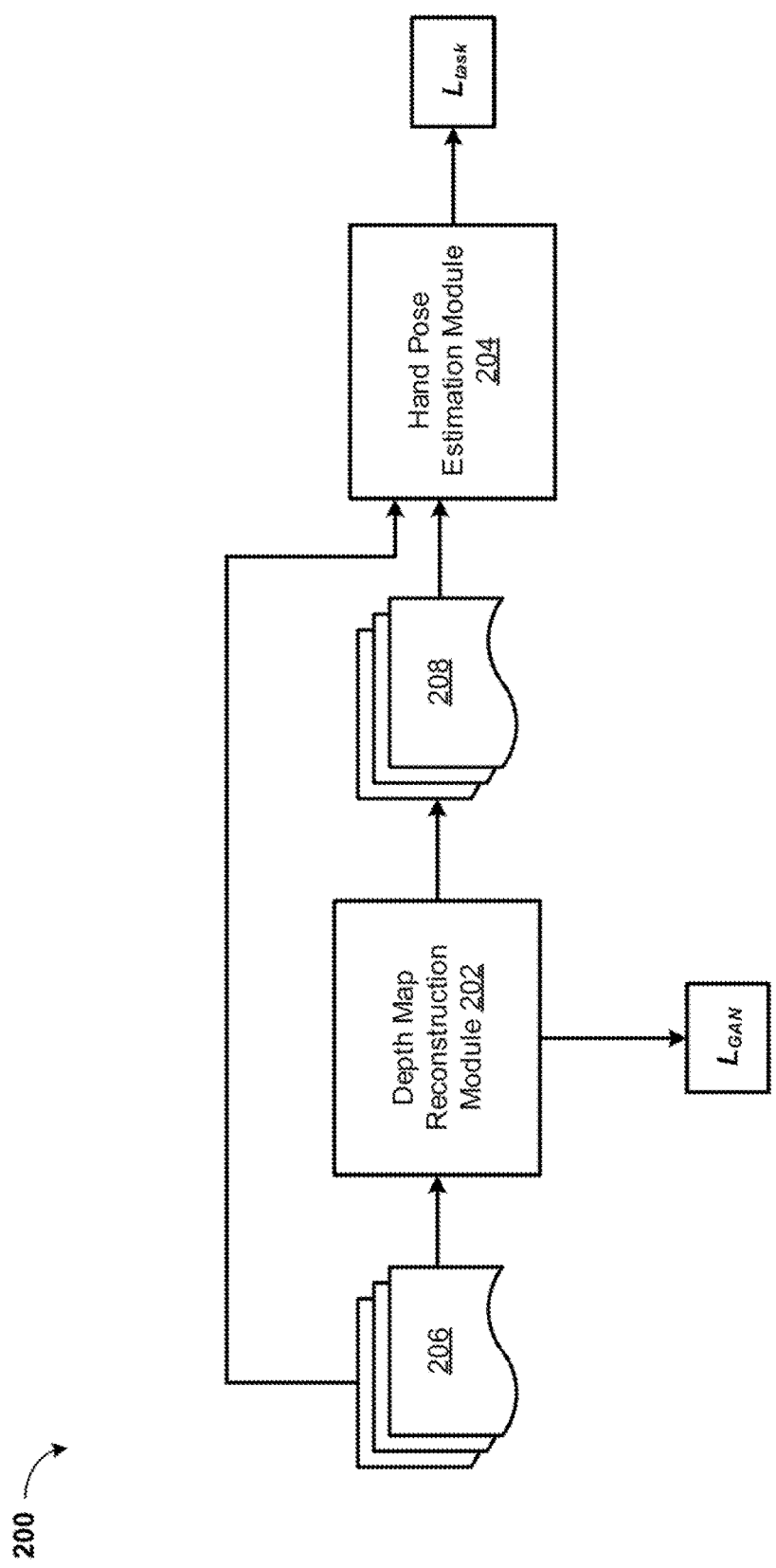
FIG. 2 is a functional block diagram of a program that estimates 3D hand poses, according to at least one embodiment.

Referring to FIG. 2, a block diagram 200 of an Hand Pose Estimation Program 116 (FIG. 1) is depicted. FIG. 2 may be described with the aid of the exemplary embodiments depicted in FIG. 1. According to one or more embodiments, the Hand Pose Estimation Program 116 may be located on the computer 102 (FIG. 1) or on the server computer 114 (FIG. 1). The Hand Pose Estimation Program 116 may include, among other things, a Depth Map Reconstruction Module 202 and a Hand Pose Estimation Module 204. According to one embodiment, the Hand Pose Estimation Program 116 may retrieve hand pose image data 206, corresponding to one or more hand pose images, from the database 112 (FIG. 1) on the server computer 114. According to an alternative embodiment, the hand pose image data 206 may be stored in the data storage device 106 (FIG. 1) on the computer 102, and the Hand Pose Estimation Program 116 may receive the hand pose image data 206 from the computer 102 over the communication network 110 (FIG. 1). The Depth Map Reconstruction Module 202 may receive the hand pose image data 206 as an input and may output one or more generated depth maps 208 corresponding to the hand pose image data 206. The Depth Map Reconstruction Module 202 may additionally calculate a generative adversarial network loss value $L_{GAN}$. The Hand Pose Estimation Module 204 may subsequently receive the hand pose image data 206 and the generated depth maps 208 as inputs and may output a determination of the 3D hand pose within the hand pose image data 206. The Hand Pose Estimation Module 204 may additionally calculate a task loss value $L_{task}$.

Figure 3:
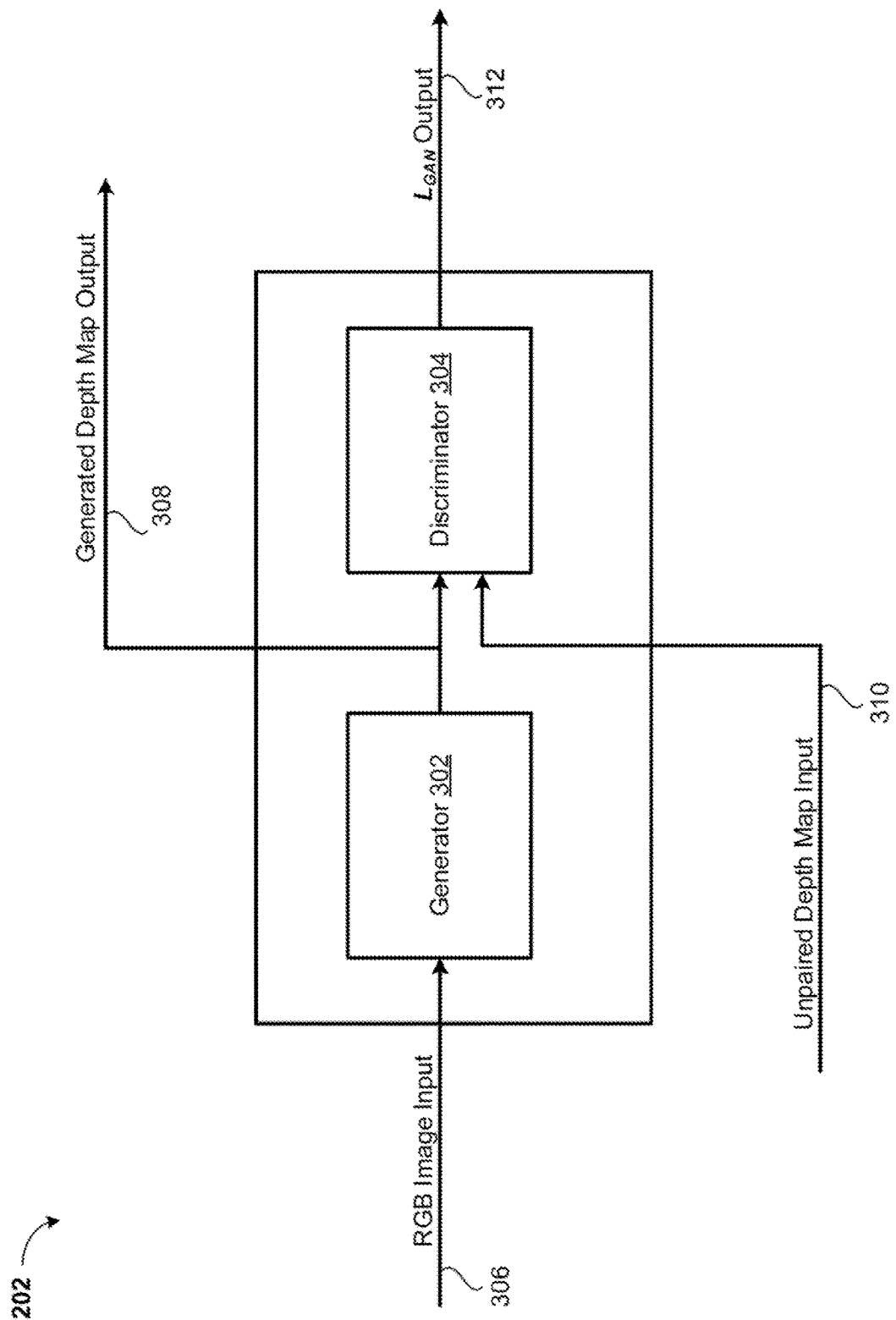
FIG. 3 is a functional block diagram of a depth map reconstruction module as depicted in FIG. 2, according to at least one embodiment.

Referring now to FIG. 3, a functional block diagram of a Depth Map Reconstruction Module 202 (FIG. 2) is depicted. The Depth Map Reconstruction Module 202 may be used, among other things, to alleviate the requirement of a depth map paired to the RGB for training. The Depth Map Reconstruction Module 202 may receive an RGB hand image and may generate its underlying depth map corresponding to the received RGB image. A set of unpaired training depth images may be used in order to train the Depth Map Reconstruction Module 202, so that an inferred depth map generated by the Depth Map Reconstruction Module 202 may be similar to a real depth map.

The Depth Map Reconstruction Module 202 may be constructed as an generative adversarial network which may infer the depth map corresponding to the input RGB image. Thus, the Depth Map Reconstruction Module 202 may accordingly include a generator 302, a discriminator 304, and data links 306, 308, 310, and 312. The generator 302 may receive an RGB image input via the data link 306 and generate a depth map 208 (FIG. 2) based solely on the received RGB image. The generator 302 may output the generated depth map 208 via the data link 308. The generator 302 may be trained based on minimizing the $L_{GAN}$ and $L_{task}$ loss values. The discriminator 304 may be configured to distinguish between a real depth map and a generated depth map. The discriminator 304 may receive the generated depth map 208 via the data link 308 and may also receive one or more unpaired depth maps via the data link 310. The discriminator 304 may determine, based on the unpaired depth maps, the $L_{GAN}$ value corresponding to the generated depth map 208. The discriminator 304 may output the $L_{GAN}$ value via the data link 312. The discriminator 304 may be trained based on maximizing the $L_{GAN}$ and $L_{task}$ loss values.

Figure 4:
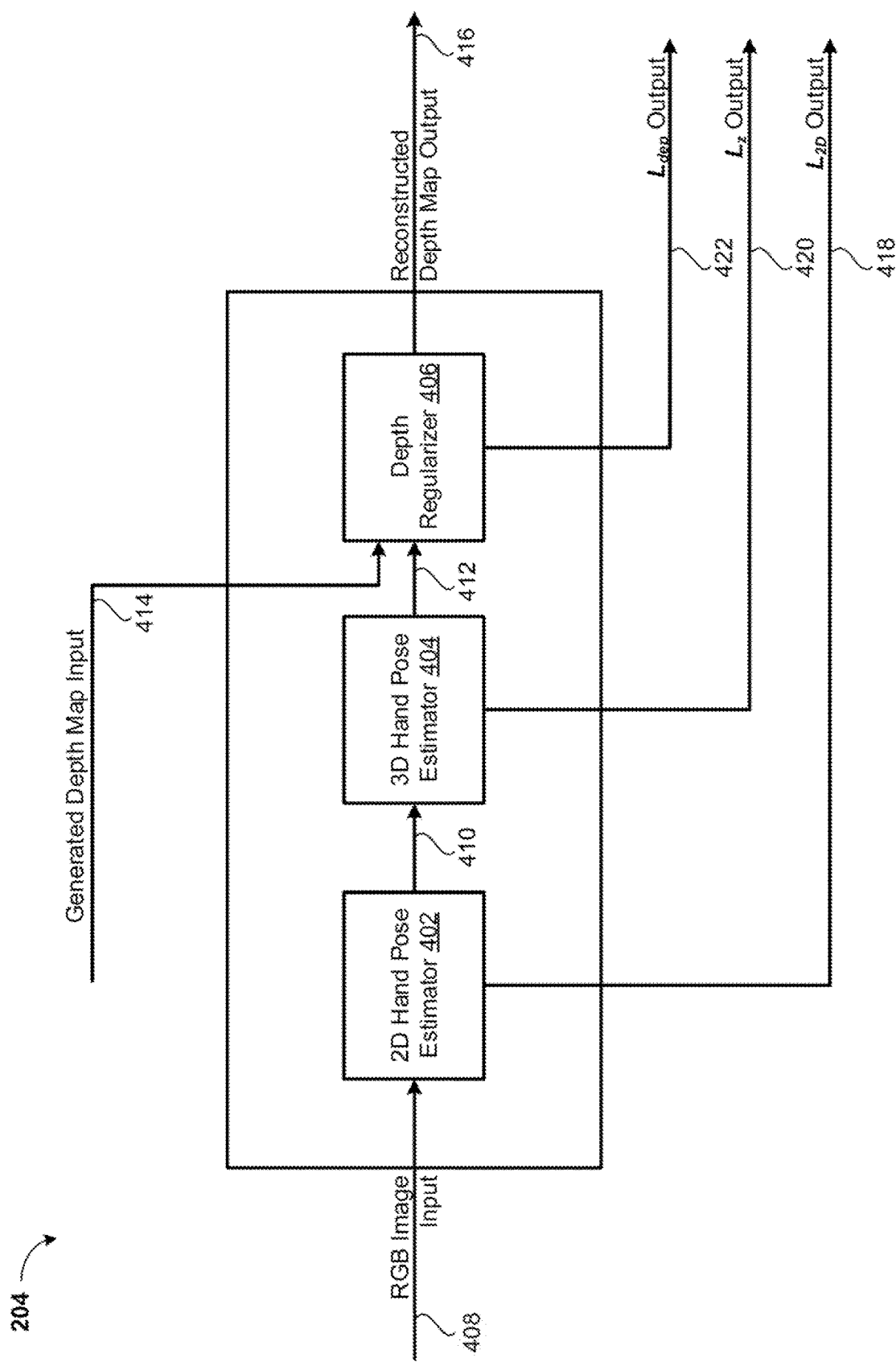
FIG. 4 functional block diagram of a hand pose estimation module as depicted in FIG. 2, according to at least one embodiment.

Referring now to FIG. 4, a functional block diagram of a Hand Pose Estimation Module 204 (FIG. 2) is depicted. The Hand Pose Estimation Module 204 may, among other things, receive an RGB image paired with an inferred (i.e., generated) depth map. The Hand Pose Estimation Module 204 may accordingly include, a 2D Hand Pose Estimator 402, a 3D Hand Pose Estimator 404, a Depth Regularizer 406, and data links 408, 410, 412, 414, 416, 418, 420, and 422. The 2D Hand Pose Estimator 402 may receive an RGB image as an input via the data link 408 and may output a hand joint heat map via the data link 410. The hand joint heat map may be sent to the 3D Hand Pose Estimator 404 via the data link 410 in order to estimate one or more 3D joint locations from the hand joint heat map. The estimated 3D joint locations may be output to the Depth Regularizer 406 via the data link 412. The Depth Regularizer 406 may reconstructs a depth map from the received 3D joint locations and may be trained with the generated depth map 208 (FIG. 2), which may be received via the data link 414. The reconstructed depth map may be output via the data link 416. A two-dimensional loss value $L_{2D}$, a z-axis loss value $L_z$, and a depth loss value $L_{dep}$ may be output by the 2D Hand Pose Estimator 402, the 3D Hand Pose Estimator 404, and the Depth Regularizer 406 via the data links 418, 420, and 422, respectively. These loss values may be used to further train the hand pose estimation system.

Figure 5:
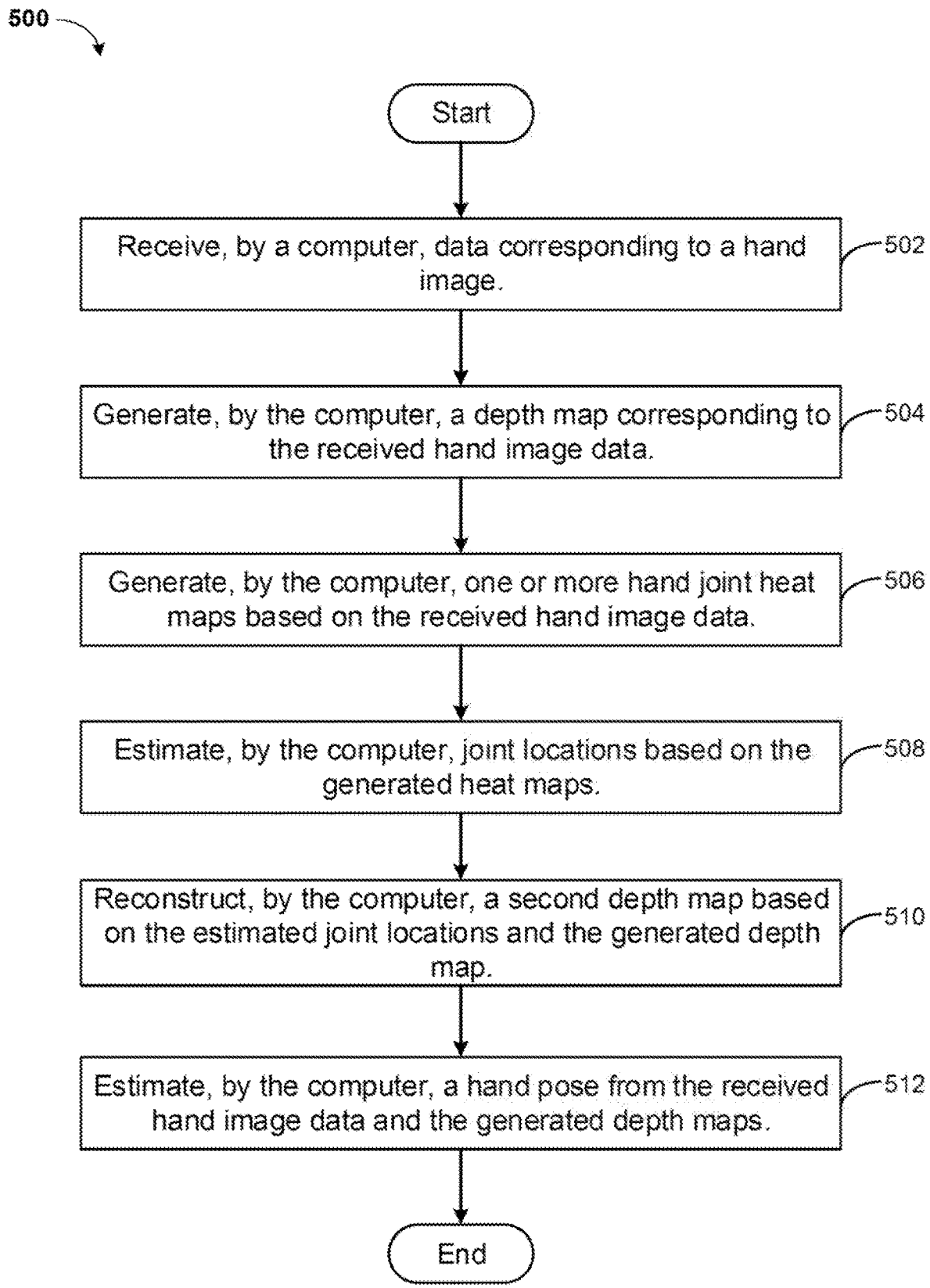
FIG. 5 is an operational flowchart illustrating the steps carried out by a program that estimates 3D hand poses, according to at least one embodiment.

Referring now to FIG. 5, an operational flowchart 500 illustrating the steps carried out by a program that estimates 3D hand poses is depicted. FIG. 5 may be described with the aid of FIGS. 1, 2, 3, and 4. As previously described, the Hand Pose Estimation Program 116 (FIG. 1) may quickly and effectively estimate 3D hand poses from RGB images.

At 502, data corresponding to a hand image is received by the computer. The hand image data may be, for example, an RGB image containing a 3D hand pose. It may be appreciated that the RGB may be in substantially any raster or vector format, such as JPG, PNG, GIF, TIFF, BMP, SVG or the like. In operation, the Hand Pose Estimation Program 116 (FIG. 1) may reside on the computer 102 (FIG. 1) or on the server computer 114 (FIG. 1). The Hand Pose Estimation Program 116 may receive the hand pose image data 206 (FIG. 2) over the communication network 110 (FIG. 1) or may retrieve the hand pose image data 206 from the database 112 (FIG. 1).

At 504, a depth map corresponding to the received hand image data is generated by the computer. The generated depth map may be generated using only the received RGB image and may be used in order to estimate the hand poses in an RGB image that does not otherwise have a corresponding depth map. In operation, the generator 302 (FIG. 3) of the Depth Map Reconstruction Module 202 (FIG. 2) may receive the hand pose image data 206 (FIG. 2) via the data link 306 (FIG. 3). The generator 302 may output the generated depth map 208 (FIG. 2) via the data link 308 (FIG. 3).

At 506, one or more hand joint heat maps are generated by the computer, based on the received hand image data. The hand joint heat maps may be used for 2D hand pose estimation in order to determine the probable locations of the joints in the hand. In operation, 2D Hand Pose Estimator 402 (FIG. 4) of the Hand Pose Estimation Module 204 (FIG. 2) may receive the hand pose image data 206 (FIG. 2) via the data link 408. The Hand Pose Estimation Module 204 may generate one or more heat maps based on the received hand pose image data 206 and may output the generated heat maps to the 3D Hand Pose Estimator 404 (FIG. 4) via the data link 410 (FIG. 4).

At 508, joint locations are estimated by the computer based on the generated heat maps. Based on the probabilities in the heat maps, the location of the joints in the hand may be estimated. By estimating the locations of the hand joint, the pose of the hand may be determined. In operation, the 3D Hand Pose Estimator 404 (FIG. 4) of the Hand Pose Estimation Module 204 (FIG. 2) may receive the generated heat maps from the 2D Hand Pose Estimator 402 (FIG. 4) via the data link 410. The 3D Hand Pose Estimator 404 may predict probable locations for the joints present in the hand pose image data 206 (FIG. 2) and may output the location data to the Depth Regularizer 406 (FIG. 4) via the data link 412.

At 510, a second depth map is generated by the computer based on the estimated joint locations and the generated depth map. This second depth map may refine the generated depth map based on probable hand joint locations and may be used to further train the system to estimate 3D hand poses. In operation, the Depth Regularizer 406 (FIG. 4) of the Hand Pose Estimation Module 204 (FIG. 2) may receive the location data from the 3D Hand Pose Estimator 404 (FIG. 4) via the data link 412. The Depth Regularizer 406 may generate a refined depth map using the generated depth map 208 (FIG. 2) received via the data link 414 (FIG. 4). The Depth Regularizer 406 may output the reconstructed depth map via the data link 416 (FIG. 4).

At 512, a hand pose is estimated from the received hand image data and the generated depth maps. As discussed above, the estimated hand pose may be used in applications such as virtual reality, augmented reality, computer vision, and other applications. In operation, the Hand Pose Estimation Module 204 (FIG. 2) may output an estimated hand pose based on the generated depth map 208 (FIG. 2), the second depth map generated by the Depth Regularizer 406 (FIG. 4), and the hand pose image data 206 (FIG. 2).

It may be appreciated that FIG. 5 provides only an illustration of one implementation and does not imply any limitations with regard to how different embodiments may be implemented. Many modifications to the depicted environments may be made based on design and implementation requirements. For example, as discussed above, in addition to estimating 3D hand poses, the method, computer system, and computer readable medium disclosed herein may be used for the detection and estimation of other 3D shapes.

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
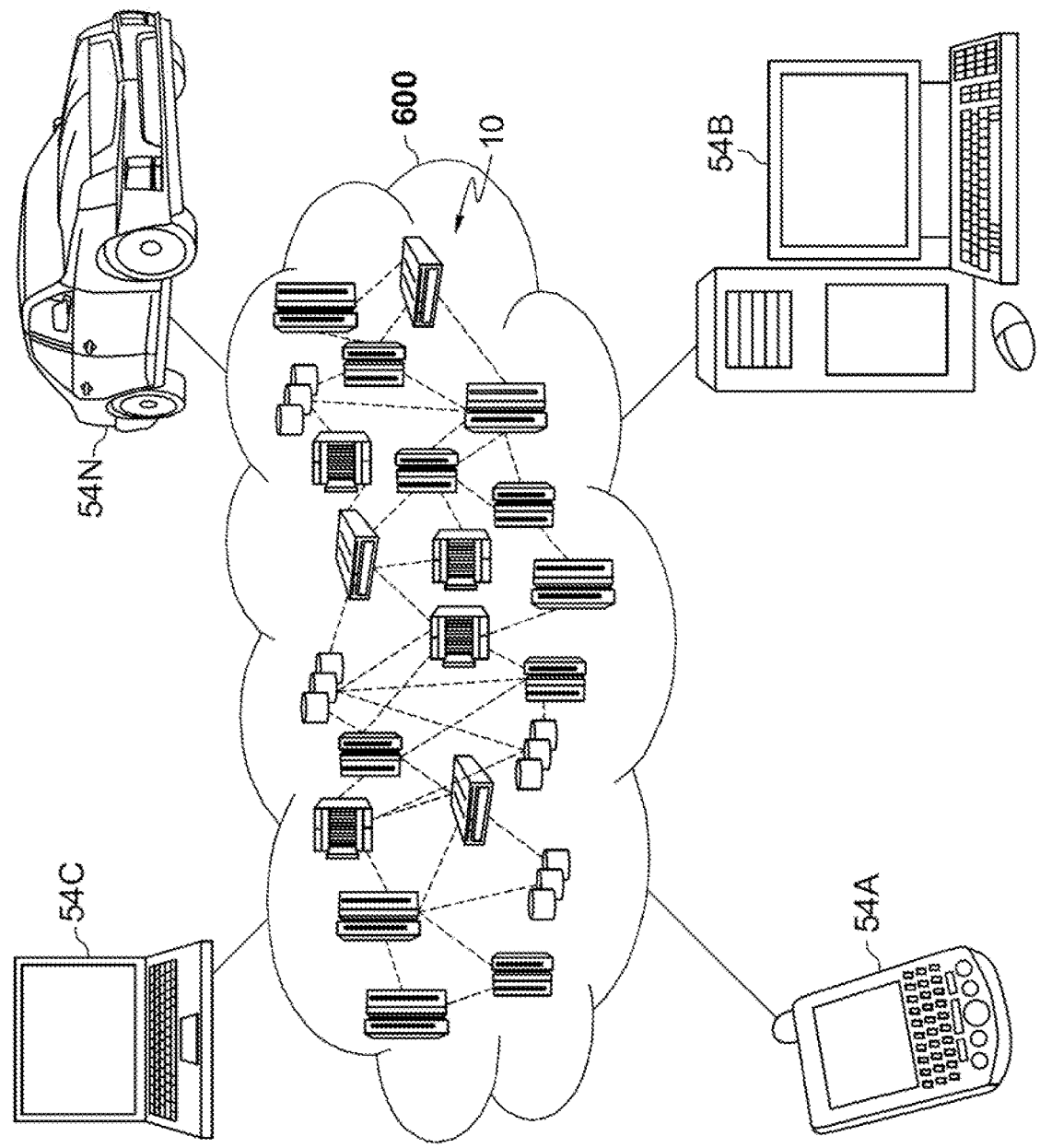
FIG. 6 is a block diagram of an illustrative cloud computing environment including the computer system depicted in FIG. 1, according to at least one embodiment.

Referring to FIG. 6, illustrative cloud computing environment 600 is depicted. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
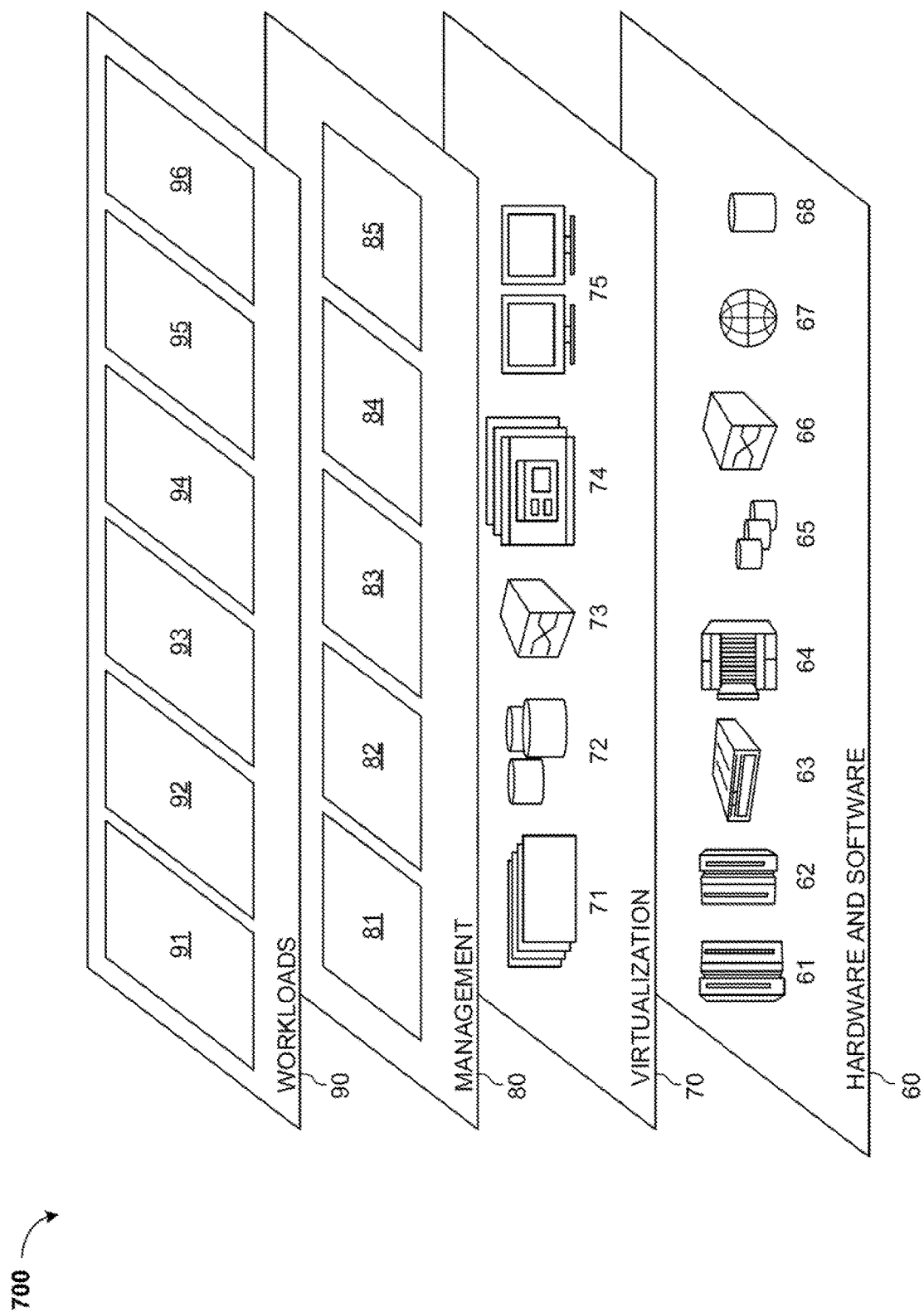
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Hand Pose Estimation 96. Hand Pose Estimation 96 may estimate 3D hand poses in received RGB images.

Figure 8:
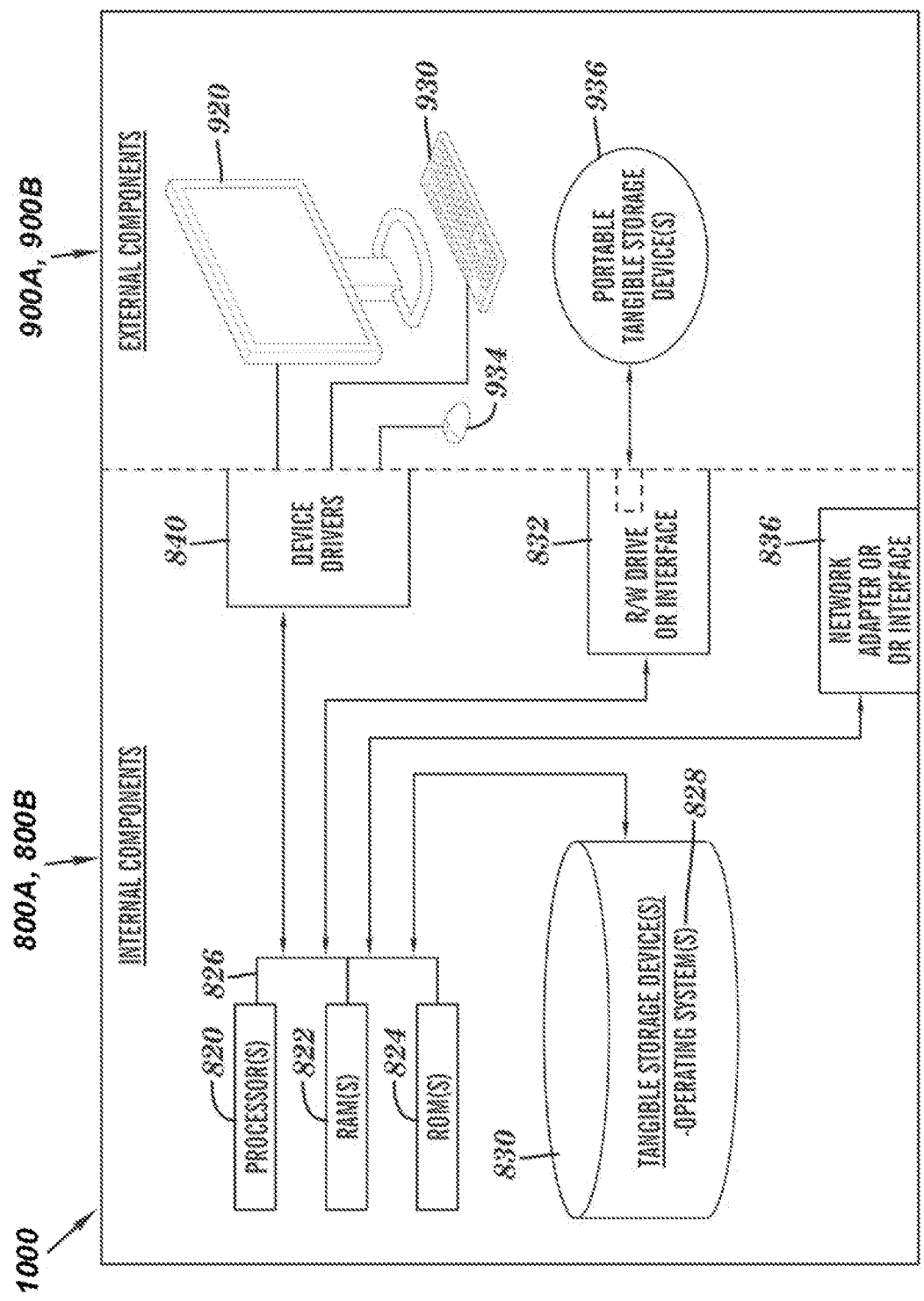
FIG. 8 is a block diagram of internal and external components of computers and servers depicted in FIG. 1 according to at least one embodiment.

FIG. 8 is a block diagram 1000 of internal and external components of computers 102 and 114 depicted in FIG. 1, in accordance with an illustrative embodiment. It should be appreciated that FIG. 8 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Hand Pose Estimation Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Hand Pose Estimation Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Hand Pose Estimation Program 116 (FIG. 1) on the server computer 114 (FIG. 1) can be downloaded to the computer 102 (FIG. 1) and the server computer 114 from an external computer via a network (for example, the Internet, a local area network or other, wide area network) and respective network adapters or interfaces 836. From the network adapters or interfaces 836, the software program 108 and the Hand Pose Estimation Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of estimating three-dimensional (3D) hand poses in images, comprising:
   receiving, by a computer, data corresponding to a hand image;
   generating, by the computer, a first depth map corresponding to the received hand image data;
   generating, by the computer, one or more hand joint heat maps based on the received hand image data;
   estimating, by the computer, joint locations based on the generated one or more hand joint heat maps;
   reconstructing, by the computer, a second depth map based on the estimated joint locations and the first depth map; and
   estimating, by the computer, a hand pose from the received hand image data and the first and second depth maps.

2. The method of claim 1, wherein the generating the first depth map is performed by a generative adversarial network.

3. The method of claim 2, wherein the generative adversarial network comprises a generator and a discriminator.

4. The method of claim 3, wherein the generative adversarial network utilizes a generative adversarial network (GAN) loss value and a task loss value as training values.

5. The method of claim 4, wherein the generative adversarial network is trained by the generator minimizing the GAN loss value and the task loss value.

6. The method of claim 4, wherein the generative adversarial network is trained by the discriminator maximizing the GAN loss value and the task loss value.

7. The method of claim 4, wherein the generator generates the first depth map using solely the received hand image data.

8. The method of claim 7, wherein the discriminator determines the GAN loss value using the first depth map and one or more unpaired depth maps.

9. The method of claim 1, wherein the hand pose is estimated by using only the received hand image data and the first and second depth maps corresponding to the received hand image data.

10. A computer system for estimating three-dimensional (3D) hand poses in images, the computer system comprising:
    one or more computer-readable non-transitory storage media configured to store computer program code; and
    one or more computer processors configured to access said computer program code and operate as instructed by said computer program code, said computer program code including:
    receiving code configured to cause the one or more computer processors to receive a data corresponding to a hand image;
    first generating code configured to cause the one or more computer processors to generate a first depth map corresponding to the received hand image data;
    second generating code configured to cause the one or more computer processors to generate one or more hand joint heat maps based on the received hand image data;
    first estimating code configured to cause the one or more computer processors to estimate joint locations based on the generated one or more hand joint heat maps; and
    reconstructing code configured to cause the one or more computer processors to reconstruct a second depth map based on the estimated joint locations and the first depth map; and
    second estimating code configured to cause the one or more computer processors to estimate a hand pose from the received hand image data and the first and second depth maps.

11. The computer system of claim 10, wherein the generating is performed by a generative adversarial network.

12. The computer system of claim 11, wherein the generative adversarial network comprises a generator and a discriminator.

13. The computer system of claim 12, wherein the generative adversarial network utilizes a generative adversarial network (GAN) loss value and a task loss value as training values.

14. The computer system of claim 13, wherein the generative adversarial network is trained by the generator minimizing the GAN loss value and the task loss value.

15. The computer system of claim 13, wherein the generative adversarial network is trained by the discriminator maximizing the GAN loss value and the task loss value.

16. The computer system of claim 13, wherein the generator generates the first depth map using solely the received hand image data.

17. The computer system of claim 16, wherein the discriminator determines the GAN loss value using the first depth map and one or more unpaired depth maps.

18. A non-transitory computer readable medium having stored thereon a computer program for estimating three-dimensional (3D) hand poses in images, the computer program configured to cause one or more computer processors to:
- receive a hand image data;
- generate a first depth map corresponding to the received hand image data;
- generate one or more hand joint heat maps based on the received hand image data;
- estimate joint locations based on the one or more hand joint heat maps;
- reconstruct a second depth map based on the estimated joint locations and the first depth map; and
- estimate a hand pose from the received hand image data and the first and second depth maps.

19. The computer system of claim 13, wherein the hand pose is estimated by using only the received hand image data and the first and second depth maps corresponding to the received hand image data.

20. The non-transitory computer readable medium of claim 18, wherein the first depth map is generated by a generative adversarial network.

* * * * *